Figure 1:
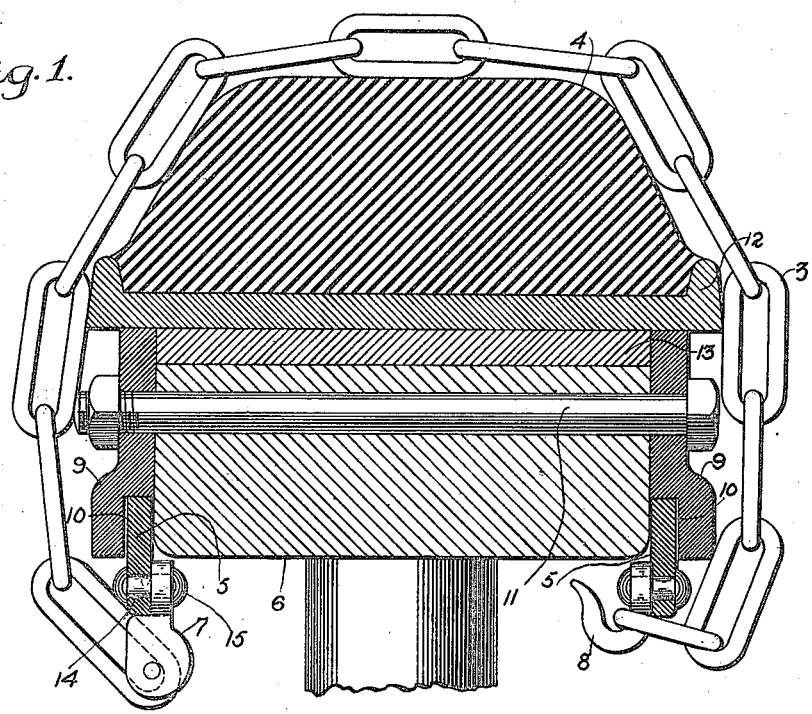

R. H. AND F. H. BACHMAN.
NONSKID DEVICE FOR AUTOMOBILE TIRES.
APPLICATION FILED JUNE 10, 1919.

1,429,825. Patented Sept. 19, 1922.

WITNESSES

INVENTORS
REUBEN H. BACHMAN
FRANK H. BACHMAN
BY
ATTORNEYS

Patented Sept. 19, 1922.

1,429,825

UNITED STATES PATENT OFFICE.

REUBEN H. BACHMAN AND FRANKLIN HIRAM BACHMAN, OF ALLENTOWN, PENNSYLVANIA.

NONSKID DEVICE FOR AUTOMOBILE TIRES.

Application filed June 10, 1919. Serial No. 303,228.

*To all whom it may concern:*

Be it known that we, REUBEN H. BACHMAN and FRANKLIN H. BACHMAN, both citizens of the United States, and residents of Allentown, in the county of Lehigh and State of Pennsylvania, have invented certain new and useful Improvements in Nonskid Devices for Automobile Tires, of which the following is a specification.

Our invention relates to a non-skid device for automobile tires, and more especially to a device of this character composed of a plurality of independent, flexible and detachable anti-skid elements encircling the tire, secured to a member movable with respect to the wheel.

The principal object of our invention is to provide a non-skid device for automobile tires which will promote the tractive effort and eliminate skidding.

A further object of our invention is to provide a non-skid device for automobile tires so designed and attached to the wheel as to function with a minimum of wear on the tire.

A further object of our invention is to provide an anti-skid chain for automobile tires of a design such that the tire encircling chains are individually and detachably mounted, thus insuring the operation of the device even though one or more of the encircling chains snap or break and permitting of the ready adjustment of chains to replace broken ones; and enabling the use of any desired number of encircling chains from one to the total number required for the entire circumference.

A still further object of our invention is to provide a simple, inexpensive and efficient anti-skid device for tires, composed of individual and independent units encircling the tire, which may readily and easily be adjusted in place, and disposed around the circumference in any number desired.

The invention comprises novel features of design, construction and arrangement and combination of parts, the embodiment and application of which, illustrated and described in the drawings, specification and appended claims, is the form preferred for the purposes of illustration; but it should be understood that the invention is not limited to such form, and that the details and application thereof may be varied without departing from the objects and scope of the claims.

Reference is to be had to the drawings, in which similar characters indicate corresponding parts throughout the several views, and in which, Figure 1 is a cross sectional view of the felloe and tire assembly of an automobile wheel illustrating the details, arrangement and combination of parts of my invention.

Figure 2:
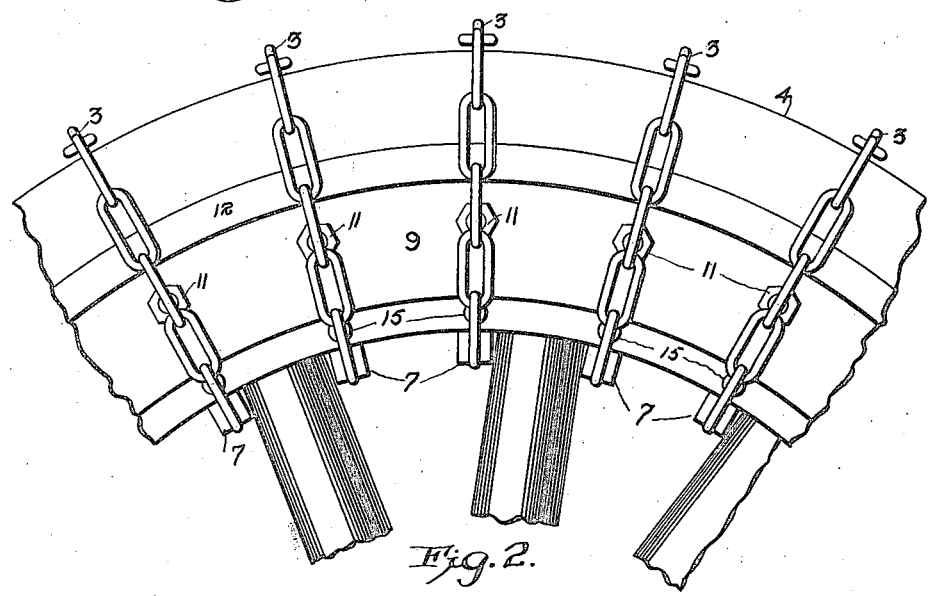

Figure 2 is a fragmentary side view of the peripheral portion of the automobile wheel shown in Figure 1.

Referring to the drawings, and proceeding to a detailed description of the preferred embodiment of our invention, the non-skid device illustrated comprises a plurality of chains 3 encircling the tire 4, and disposed around the circumference of the wheel, each of said chains being detachably connected at its ends to annular bands 5, located one at each side of the wheel adjacent the felloe 6. Secured one at each side of the felloe 6 by means of clampings bolts 11 are flanged side rings 9, having annular recesses 10 which form, with the side surface of felloe 6 a circular groove for the reception of annular bands 5, an appreciable clearance being allowed between contiguous surfaces of recesses 10, felloe 6 and annular bands 5 so that the latter may be free to move within said groove. The flanged side rings 9 may be made to extend radially from the inner surface of the felloe 6 to and under the rim 12, thus embracing and reinforcing the felloe 6 and felloe band 13.

Near the inner edge of annular bands 5, circumferentially disposed holes 14 are drilled through said bands, at a proper radius from the center of the wheel, and at intervals around the said bands depending upon the number of chains desired, the purpose of said holes 14 being to receive rivets or bolts 15 securing stirrups 7 and hooks 8 to said bands 5. The end links of chains 3 on one side of the wheel are secured between the branches of stirrups 7 by means of lateral bolts 16 inserted within said links and fitting apertures in said branches; the ends of chains 3 on the other side of the wheel are secured by means of hooks 8, the stirrups being preferably at the outer side of the wheel and the hooks at the inner side.

Having thus described our invention, we claim as new and desire to secure by Letters Patent,

1. A non-skid device of the character described, comprising, in combination, a plurality of flexible non-skid elements transversely disposed across the tread of the tire, annular bands disposed one on each side of the wheel, said bands having recesses opening toward the center of the wheel, and secured to the felloe thereof, a pair of rings one on each side of the wheel, loosely mounted in the recesses of the bands between said bands and said felloe, each of said rings carrying means for securing thereto the opposite ends of said anti-skid elements.

2. A non-skid device of the character described, comprising annular bands adapted to be secured to the opposite sides of a felloe and provided with recesses opening toward the center of the wheel, rings loosely mounted in the recesses of the bands, and a plurality of chains, each having one end permanently secured to one ring and its other end detachably secured to the other ring.

3. A non-skid device of the character described, comprising, in combination, a plurality of flexible non-skid elements laterally disposed across the tread of the tire, annular bands disposed one on each side of the wheel, said bands being recessed on their inner faces and secured to the felloe thereof, said recesses opening toward the center of the wheel, a pair of rings one on each side of the wheel, loosely mounted in the recesses of the bands between said bands and said felloe, one of said bands carrying a plurality of stirrups and the other of said bands hooks for fastening the ends of non-skid elements.

REUBEN H. BACHMAN.
FRANKLIN HIRAM BACHMAN.